US008792841B2

(12) United States Patent
Park

(10) Patent No.: US 8,792,841 B2
(45) Date of Patent: Jul. 29, 2014

(54) METHOD FOR PROVIDING RADIO CHANNEL LIST AND MOBILE TERMINAL SUPPORTING THE SAME

(75) Inventor: Sung Ryong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 13/475,161

(22) Filed: May 18, 2012

(65) Prior Publication Data

US 2012/0329413 A1 Dec. 27, 2012

(30) Foreign Application Priority Data

Jun. 24, 2011 (KR) ........................ 10-2011-0061851

(51) Int. Cl.
*H04B 1/06* (2006.01)
*H04H 60/41* (2008.01)
*H04H 20/57* (2008.01)
*H04H 60/43* (2008.01)
*H04H 60/93* (2008.01)

(52) U.S. Cl.
CPC ............... *H04H 60/41* (2013.01); *H04H 20/57* (2013.01); *H04H 60/43* (2013.01); *H04H 60/93* (2013.01)
USPC ...... 455/161.1; 455/550.1; 455/73; 455/3.06; 725/62; 725/63; 725/136

(58) Field of Classification Search
CPC ..... H04H 60/41; H04B 1/3888; H04M 1/605; H04M 1/6066
USPC .................. 455/161.1, 550.1, 566, 73, 426.1, 455/553.1, 61, 3.06, 3.02, 464, 509, 135, 455/127.4, 124, 121, 188.1, 334; 725/136, 725/62, 63; 370/329, 330, 331, 332, 431
See application file for complete search history.

(56) References Cited

U.S. PATENT DOCUMENTS

| | | | | |
|---|---|---|---|---|
| 5,625,878 | A * | 4/1997 | Lopponen et al. | 455/509 |
| 5,808,702 | A * | 9/1998 | Yoshinobu et al. | 348/731 |
| 5,937,002 | A * | 8/1999 | Andersson et al. | 375/131 |
| 2002/0147003 | A1* | 10/2002 | Tada et al. | 455/412 |
| 2004/0038704 | A1* | 2/2004 | Takagi | 455/550.1 |
| 2005/0091689 | A1* | 4/2005 | Lee | 725/62 |
| 2007/0288987 | A1* | 12/2007 | Kim et al. | 725/136 |
| 2008/0134276 | A1* | 6/2008 | Orrell et al. | 725/132 |
| 2008/0233883 | A1* | 9/2008 | Ibrahim et al. | 455/61 |
| 2008/0248799 | A1* | 10/2008 | Choi | 455/426.1 |
| 2009/0157685 | A1* | 6/2009 | Sorensen | 707/9 |
| 2010/0099404 | A1* | 4/2010 | Khoo et al. | 455/433 |

* cited by examiner

*Primary Examiner* — Tan Trinh
(74) *Attorney, Agent, or Firm* — Jefferson IP Law, LLP

(57) ABSTRACT

A method for providing a radio channel list and a mobile terminal supporting the method are disclosed. The mobile terminal includes a radio module for performing a radio channel search and for supporting radio broadcast reception, a radio antenna that serves as an antenna for the radio module, a switch placed between the radio module and the radio module, and a control unit for controlling a process of generating a first channel list of ineffective radio channels by performing radio channel search while the radio antenna is disconnected from the radio module by the switch, generating a second channel list of effective radio channels by performing radio channel search while the radio antenna is connected to the radio module by the switch, creating a valid radio channel list by removing entries of the first channel list from the second channel list, and providing the created valid radio channel list.

20 Claims, 6 Drawing Sheets

METHOD FOR PROVIDING RADIO CHANNEL LIST AND MOBILE TERMINAL SUPPORTING THE SAME

PRIORITY

This application claims the benefit under 35 U.S.C. §119 (a) of a Korean patent application filed on Jun. 24, 2011 in the Korean Intellectual Property Office and assigned Serial No. 10-2011-0061851, the entire disclosure of which is hereby incorporated by reference.

BACKGROUND OF THE INVENTION

1. Field of the Invention

The present invention relates to radio broadcast reception. More particularly, the present invention relates to a method and mobile terminal configured to provide a valid radio channel list including only effective radio channels so that a user can readily select a desired radio channel to obtain necessary information.

2. Description of the Related Art

Due to rapid technical advances, a mobile terminal can support not only basic voice calls and short text messages, but also various other functions. For example, the mobile terminal may support functions related to video calls, electronic schedulers, and the Internet. To support basic call handling functions, the mobile terminal may provide various functions related to voice reception, audio output, and screen display. The mobile terminal may also provide an audio output switching function to switch audio output from a speaker to an earphone.

The mobile terminal may also support radio broadcast reception. To achieve radio broadcast reception, the mobile terminal includes a radio module, and searches for radio channels using the radio module to provide a list of radio channels. During the radio channel search, the radio module may be affected by various noises generated from nearby surroundings. Hence, the radio channel list provided by the radio module may include ineffective channels or channels that do not carry audio data.

Accordingly, the user may have difficulty in distinguishing effective or valid radio channels from ineffective radio channels and be inconvenienced by having to reselect a radio channel when an ineffective radio channel is selected from the radio channel list.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method that produces a valid radio channel list including only effective radio channels readily available to the user and a mobile terminal supporting the method.

Another aspect of the present invention is to provide a method that produces a valid radio channel list including only effective radio channels so that the user may easily and rapidly select a desired radio channel from the valid radio channel list and a mobile terminal supporting the method.

In accordance with an aspect of the present invention, a mobile terminal capable of providing a radio channel list is provided. The terminal includes a radio module for performing a radio channel search and for supporting radio broadcast reception, a radio antenna that serves as an antenna for the radio module, a switch placed between the radio module and the radio module, and a control unit for controlling a process of generating a first channel list of ineffective radio channels by performing radio channel search while the radio antenna is operatively disconnected from the radio module by the switch, generating a second channel list of effective radio channels by performing radio channel search while the radio antenna is operatively connected to the radio module by the switch, creating a valid radio channel list by removing entries of the first channel list from the second channel list, and providing the created valid radio channel list.

In accordance with another aspect of the present invention, a mobile terminal capable of providing a radio channel list is provided. The terminal includes a radio module for performing a radio channel search and for supporting radio broadcast reception, a radio antenna that serves as an antenna for the radio module, a switch placed between the radio module and the radio module, and a control unit for controlling a process of identifying a current listening mode while the radio antenna is operatively connected to the radio module, creating a radio channel list by searching for only radio channels related to the current listening mode based on a frequency band assigned to the current listening mode and a preset radio channel allocation cycle, and providing the created radio channel list.

In accordance with another aspect of the present invention, a method of providing a radio channel list is provided. The method includes generating a first channel list of ineffective radio channels by performing radio channel search while a radio antenna is operatively disconnected from a radio module by a switch, generating a second channel list of effective radio channels by performing radio channel search while the radio antenna is operatively connected to the radio module by the switch, creating a valid radio channel list by removing entries of the first channel list from the second channel list, and outputting the valid radio channel list.

In accordance with another aspect of the present invention, a method of providing a radio channel list is provided. The method includes toggling a switch that is disposed between a radio module and a radio antenna between a connected state and a disconnected state, identifying a current listening mode of the radio module, searching for radio channels related only to the current listening mode while the radio antenna is operatively connected to the radio module by the switch based on a frequency band assigned to the current listening mode and a preset radio channel allocation cycle, creating a valid radio channel list that includes only radio channels searched in relation to the current listening mode, and outputting the valid radio channel list.

In accordance with another aspect of the present invention, a method of providing a radio channel list is provided The method includes disconnecting a radio antenna from a radio module, searching for radio channels having interference when the radio antenna is disconnected from the radio module, generating a first channel list based on radio channels found to have interference when the radio antenna is disconnected from the radio module, connecting the radio antenna to the radio module, searching for radio channels through which at least one of a signal and noise is being transmitted, generating a second channel list based on radio channels found to have at least one of a signal and noise being transmitted therethrough, determining which of the channels provided in the second channel list respectively correspond to a valid radio channel based on a comparison between the first channel list and the second channel list, generating a valid radio channel list comprising any of the channels determined to correspond to a valid radio channel, and outputting the valid radio channel list.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
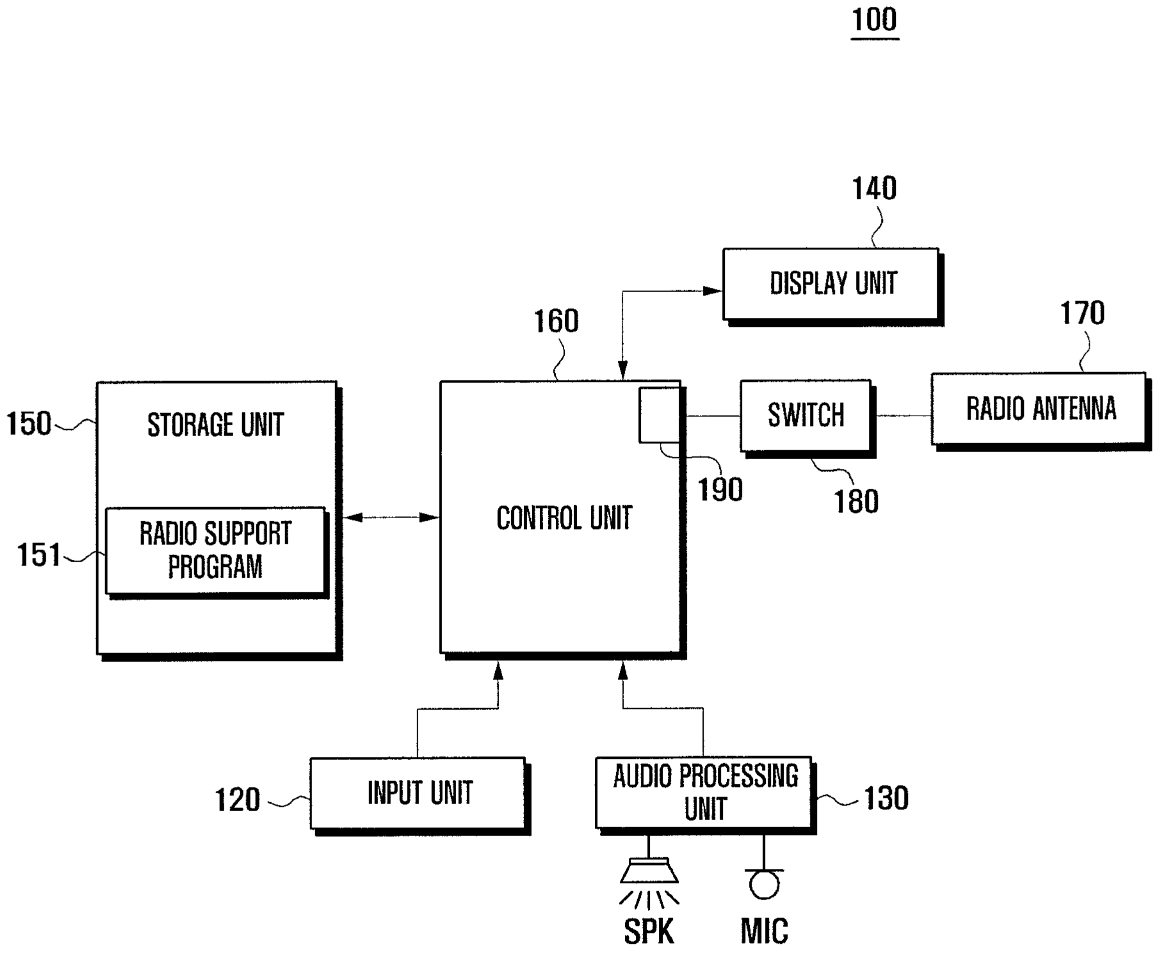
FIG. 1 is a block diagram of a mobile terminal according to an exemplary embodiment of the present invention.

FIG. 1 is a block diagram of a mobile terminal capable of providing a radio channel list according to an exemplary embodiment of the present invention.

Referring to FIG. 1, a mobile terminal 100 may include an input unit 120, an audio processing unit 130, a display unit 140, a storage unit 150, a switch 180, a radio antenna 170, and a control unit 160. The mobile terminal 100 may further include a wireless communication unit to support mobile communication. The control unit 160 may include a radio module 190. In another exemplary embodiment, the radio module 190 may be a separate entity or unit that is independent of the control unit 160.

In response to a user input corresponding to a radio listening request, the mobile terminal 100 may activate the radio module 190 and may search for internal noise channels on the basis of the radio antenna 170 connected through the switch 180. In particular, the mobile terminal 100 may turn off the switch 180 so as to operatively block the connection between the radio module 190 and the radio antenna 170, and may perform a radio channel search. The mobile terminal 100 may regard radio channels found while the radio antenna 170 is disconnected as internal noise channels. Thereafter, the mobile terminal 100 may operatively turn on the switch 180 to reestablish the connection between the radio module 190 and the radio antenna 170, and perform another radio channel search. As an example, the mobile terminal 100 may create a valid radio channel list by removing those radio channels found while the radio antenna 170 is disconnected from a list of radio channels found while the radio antenna 170 is connected. After creation of the valid radio channel list, the mobile terminal 100 may provide the valid radio channel list through the display unit 140 or the like. Hence, the mobile terminal 100 enables a user to easily initiate radio channel search and to easily select a desired radio channel.

More specifically, the input unit 120 may generate input signals corresponding to a user's input for activating the radio listening function, for selecting a listening mode, for searching for valid or effective radio channels, for selecting one of the valid radio channels, and for terminating the radio listening function. The input unit 120 may forward the generated input signals to the control unit 160. According to exemplary embodiments, the input unit 120 may include a plurality of alphanumeric and function keys for inputting alphanumeric information and for setting various functions. The function keys may include direction, side, and shortcut keys associated with specific functions. If the mobile terminal 100 is of a full touchscreen type, then the input unit 120 may include separate side keys and shortcut keys. According to an exemplary embodiment, the input unit 120 may be implemented using a key map displayed on the touchscreen. For example, the input unit 120 may be operatively integrated into the display unit 140.

The audio processing unit 130 includes a speaker (SPK) for outputting audio data. For example, the speaker may output audio data generated during playback of music files and/or video files, may output audio data generated during a voice and/or video call, or the like. The audio processing unit 130 also includes a microphone (MIC) for collecting an audio signal such as a voice signal during a video call. After activation of the radio listening function, the audio processing unit 130 may sustain the audio output path and audio collection path or may switch to an external device like a headset under control of the control unit 160. According to exemplary embodiments of the present invention, during radio channel search, the audio processing unit 130 may output a sound effect (e.g., an alert) notifying the user that the mobile terminal 100 is searching for internal noise channels, and output a sound effect (e.g., an alert) notifying the user that the mobile terminal 100 is searching for valid radio channels according to a selected listening mode. The audio processing unit 130 may also output a sound effect (e.g., an alert) notifying the user of an output of a valid radio channel list. Output of such sound effects may be changed or skipped according to user settings or terminal capabilities.

The display unit 140 displays various menus of the mobile terminal 100, information input by the user, and information to be provided to the user. For example, the display unit 140 may output various screens related to utilization of the mobile terminal 100, such as an idle screen, a menu screen, a message composition screen, a call handling screen, an ending screen, a boot screen, and/or the like. The display unit 140 may be configured with a flat display panel. As an example, the flat display panel may include a Liquid Crystal Display (LCD) devices or Organic Light Emitting Diodes (OLED). According to exemplary embodiments, the display unit 140 may be configured to include a display panel and a touch panel.

According to exemplary embodiments of the present invention, the display unit 140 may display various screens related to output of a valid radio channel list. For example, the display unit 140 may output a screen presenting the connection status of the radio antenna 170, a screen indicating the current listening mode, a screen for searching for internal noise channels, and a screen for searching for effective channels according to a selected listening mode. The display unit 140 may further output a screen displaying a valid radio channel list created considering at least one of internal noise channels and effective channels for a selected listening mode, and a screen for listening to radio broadcasts on a selected effective channel.

The storage unit 150 stores application programs related to exemplary embodiments of the present invention, and screen images to be output to the display unit 140. If the display unit 140 has a touchscreen capability, then the storage unit 150 may store key maps, menu maps, and information on a partial touch lock release zone for the touchscreen capability. The key maps may correspond to various keyboard layouts including a 3*4 layout and a QWERTY layout. The key maps may include a control key map for controlling execution of an activated application program. The menu maps may include a menu map for controlling execution of an activated application program.

As an example, the storage unit 150 may include a program region and a data region. The program region may store an Operating System (OS) for booting and operating the mobile terminal 100. The program region may also store application programs for supporting various user functions, such as application programs for call-related functions, a browser for accessing a web server, an application program for playback of MP3 or other audio data, and an application program for viewing still images and/or moving images. In particular, the program region may store a radio support program 151 to support radio broadcast reception and to provide a valid radio channel list.

The radio support program 151 may be loaded on the control unit 160 according to a user request. The radio support program 151 supports provision of a valid radio channel list and radio broadcast reception on a selected valid radio channel. To achieve this, the radio support program 151 may include a unit for selecting a listening mode according to an input signal, a unit for searching for effective radio channels according to a selected listening mode, a unit for searching for internal noise channels, a unit for outputting a valid radio channel list, and a unit for supporting radio broadcast reception.

The unit for listening mode selection changes the listening mode according to an input signal. For example, the listening mode may be set to one of a mono mode, a stereo mode, a Radio Data System (RDS) mode, and a Radio Broadcasting Data System (RBDS) mode. The unit for searching for effective radio channels may include a unit or sub-module for identifying a selected listening mode, a unit or sub-module for finding an effective frequency band related to the selected listening mode, a unit or sub-module for searching for radio channels in the found frequency band, and a unit or sub-module for creating a valid radio channel list on the basis of the found radio channels. The unit for searching for internal noise channels may include a unit or sub-module for controlling the switch 180, a unit or sub-module for searching for radio channels in on and off states of the switch 180, a unit or sub-module for comparing channel search results, and a unit or sub-module for determining internal noise channels using comparison results.

The unit for outputting a valid radio channel list may include a unit or sub-module for creating a valid radio channel list without internal noise channels on the basis of results of the unit for searching for internal noise channels, a unit or sub-module for creating a valid radio channel list on the basis of results of the unit for searching for effective radio channels, and a unit or sub-module for creating a valid radio channel list on the basis of both results of the unit for searching for internal noise channels and results of the unit for searching for effective radio channels. The unit for outputting a valid radio channel list may further include a unit or sub-module for outputting the created valid radio channel lists to the display unit 140.

The data region is an area that stores data generated in the course of using the mobile terminal 100. The data region may store phonebook information, one or more icons associated with widgets, and various content. In particular, the data region may store information regarding effective radio channels. The information regarding effective radio channels may include at least one of a list of valid radio channels without internal noise channels, a list of searched valid radio channels as to a selected listening mode, and a list of searched valid radio channels as to a selected listening mode without internal noise channels. The data region may store information regarding frequency bands respectively associated with listening modes to facilitate searching for effective radio channels according to a selected listening mode.

The radio antenna 170 is operatively connected to the radio module 190 through the switch 180, and acts as an antenna for the radio module 190. The radio antenna 170 may be an internal antenna connected to the switch 180. If the radio antenna 170 is an internal antenna, the radio antenna 170 may be implemented as an antenna pattern and placed at a given location in the mobile terminal 100. Alternatively, the radio antenna 170 may be a removable external antenna. In this case, the radio antenna 170 may be an earphone, which may be coupled to an earphone interface of the mobile terminal 100. In such an exemplary embodiment, the switch 180 may be placed between the earphone interface and the control unit 160.

The switch 180 is placed between the radio module 190 of the control unit 160 and the radio antenna 170, and may operatively connect and operatively disconnect the radio antenna 170 to and from the radio module 190 under control of the control unit 160. The switch 180 is operatively turned off while the mobile terminal 100 performs an internal noise channel search. Conversely, the switch 180 is operatively turned on while the mobile terminal 100 performs an effective radio channel search or during radio broadcast reception.

The radio module 190 is activated in response to a user request and supports radio broadcast reception under control of the control unit 160. According to exemplary embodiments of the present invention, the radio module 190 may be realized as a single chip in the control unit 160. The radio module 190 may also be realized as a separate entity, which may be an internal component or external component of the mobile terminal 100 that is connectable to the control unit 160 depending upon design. The radio module 190 may support various listening modes such as a mono mode, a stereo mode, and an RDS/RBDS mode. The radio module 190 may receive a signal over a frequency band assigned to a selected listening mode and may decode the received signal.

The control unit 160 controls supply of power to the components of the mobile terminal 100 for initialization. The control unit 160 controls operations of the various components to create and output a valid radio channel list. For example, the control unit 160 may control various signal flows to create and output a valid radio channel list. A configuration of the control unit 160 is described with respect to FIG. 2.

When a wireless communication unit for supporting mobile communication is included in the mobile terminal 100, the wireless communication unit may establish a communication channel for a voice call, a video call, or a data call for messages under control of the control unit 160. The wireless communication unit may establish a communication channel with a radio information server, and may receive information regarding frequency bands allocated to a selected listening mode from the radio information server. The storage unit 150 may operatively store the received information on frequency bands allocated to the selected listening mode and may provide the information to the control unit 160 at the time of valid radio channel search.

Figure 2:
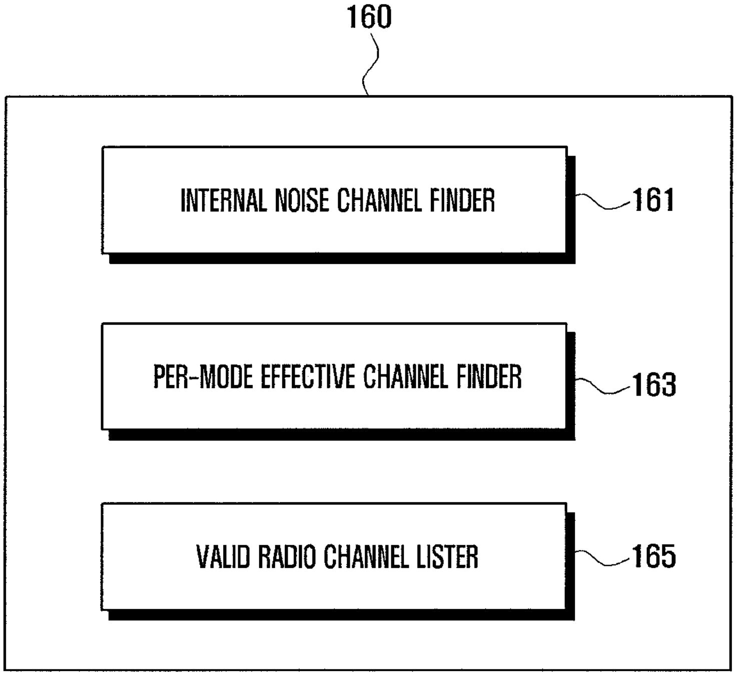
FIG. 2 illustrates a detailed configuration of a control unit of a mobile terminal such as, for example, the mobile terminal illustrated in FIG. 1, according to an exemplary embodiment of the present invention.

FIG. 2 illustrates a detailed configuration of a control unit of a mobile terminal such as, for example, the mobile terminal illustrated in FIG. 1, according to an exemplary embodiment of the present invention.

Referring to FIG. 2, control unit 160 may include an internal noise channel finder 161, a per-mode effective channel finder 163, and a valid radio channel lister 165.

The internal noise channel finder 161 searches for internal noise channels in response to an input signal. The internal noise channel finder 161 controls the switch 180 in response to a noise channel search request. For example, the noise channel search request may be made through one of the input unit 120 and the display unit 140 having a touchscreen capability. As another example, the channel search request may be made according to preset scheduling information. Initially, the radio antenna 170 may be operatively connected to the radio module 190 through the switch 180. The internal noise channel finder 161 operatively turns off the switch 180 so as to block the connection between the radio antenna 170 and the radio module 190. Thereafter, the internal noise channel finder 161 controls the radio module 190 to search for radio channels in a current environment. After the mobile terminal 100 performs a radio channel search while the radio antenna 170 is operatively disconnected from the radio module 190, the internal noise channel finder 161 operatively turns on the switch 180 so as to connect the radio antenna 170 and the radio module 190. The internal noise channel finder 161 also controls the radio module 190 to search for radio channels while the radio antenna 170 is operatively connected to the radio module 190. In other words, the internal noise channel finder 161 operatively controls the switch 180 and the radio module 190 so as to search for first radio channels while the radio antenna 170 is operatively disconnected from the radio module 190. The internal noise channel finder 161 also operatively controls the switch and the radio module 190 so as to search for second radio channels while the radio antenna 170 is operatively connected to the radio module 190. As an example, the first radio channels may be channels found amid self noises of the radio module 190 and may not carry data. In other words, the first radio channels may be channels detected based on noise generated by the mobile terminal 100 and any of the components therein. The internal noise channel finder 161 may forward information on the first and second radio channels to the valid radio channel lister 165.

The per-mode effective channel finder 163 identifies the current listening mode in response to a channel search request. The channel search request may be made by the user, or may be made according to preset scheduling information during radio broadcast reception. As an example, the current listening mode may be one of a mono mode, a stereo mode, an RDS mode, and an RBDS mode. For example, as shown in FIG. 3, listening modes may be associated with specific frequency bands.

Figure 3:
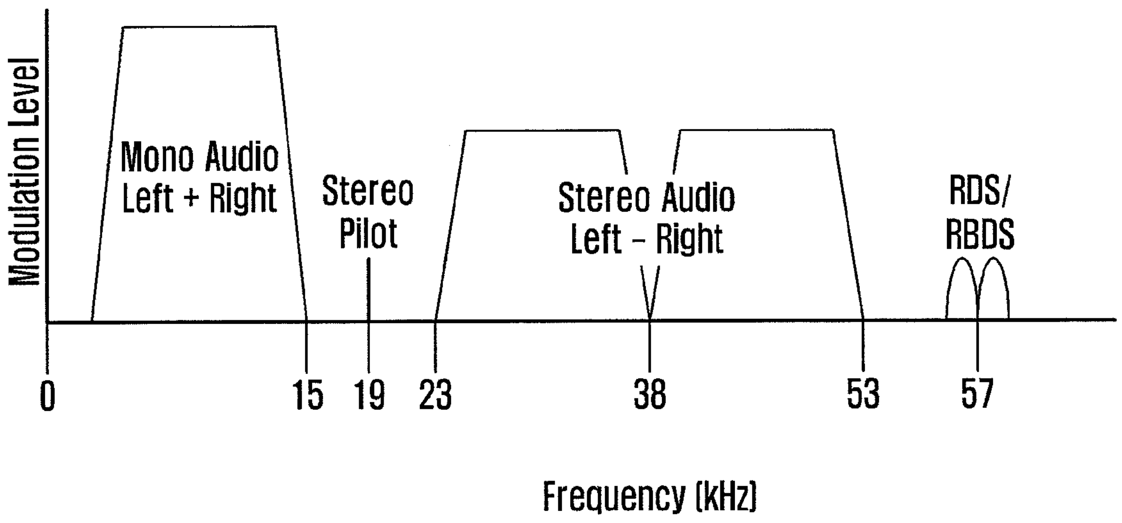
FIG. 3 illustrates allocation of frequency bands according to listening modes according to an exemplary embodiment of the present invention.

FIG. 3 illustrates allocation of frequency bands according to listening modes according to an exemplary embodiment of the present invention.

Referring to FIG. 3, the radio frequencies may be assigned to the listening modes in units of 60 KHz. For example, in a frequency band of 60 KHz, a band of 0-15 KHz is assigned to the mono mode, a band of 19 KHz is assigned to the stereo pilot tone, a band of 23-53 KHz is assigned to the stereo mode, and a band of about 57 KHz is assigned to the RDS mode or RBDS mode.

After identification of the listening mode, the per-mode effective channel finder 163 may search for effective radio channels on the basis of frequency bands corresponding to the listening mode. For example, when the current listening mode is a mono mode and radio frequencies are allocated in units of 100 kHz, the per-mode effective channel finder 163 may search for effective radio channels in frequency bands of 0-20 KHz, 100-120 KHz and 200-220 KHz. Thereafter, the per-mode effective channel finder 163 may forward the results of channel search in specific frequency bands to the valid radio channel lister 165.

The valid radio channel lister 165 may create a valid radio channel list according to a user request or preset scheduling information, and may output the created valid radio channel list to the display unit 140. More specifically, according to a user request, the valid radio channel lister 165 may create one of a first list of valid radio channels without internal noise channels, a second list of valid radio channels as to a selected listening mode, and a third list of valid radio channels as to a selected listening mode without internal noise channels. The valid radio channel lister 165 may output the created list of valid radio channels to the display unit 140 according to a user request or preset scheduling information.

In creation of the first list of valid radio channels without internal noise channels, the valid radio channel lister 165 may prevent or limit erroneous classifications of an effective radio channel as a noise channel. In order to prevent or limit the erroneous classifications of an effective radio channel as a noise channel, information on actual effective radio channels may be pre-stored in the storage unit 150. Referring to the pre-stored information, the valid radio channel lister 165 may restore a radio channel having been classified as a noise channel to an effective radio channel. According to exemplary embodiments of the present invention, the information on actual effective radio channels may be pre-stored by the manufacturer at the time of manufacture or may be downloaded later from a server at a time at which the mobile terminal 100 is updated.

When a radio channel is selected from a valid radio channel list displayed on the display unit 140, the control unit 160 may control an operation to receive a signal over the selected radio channel, decode the received signal, and reproduce the decoded signal.

As described above, the mobile terminal 100 may create a list of radio channels without internal noise channels. Hence, the mobile terminal 100 may provide only actually available radio channels to the user. To create a list of effective radio channels, the mobile terminal 100 may search those frequency bands allocated only to the currently selected listening mode. Hence, the mobile terminal 100 may rapidly conduct radio channel search and provide information only on radio channels related to the currently selected listening mode. When the listening mode is changed, the mobile terminal 100 may automatically search effective radio channels related to the new listening mode and display a list of searched effective radio channels on the display unit 140.

Figure 4:
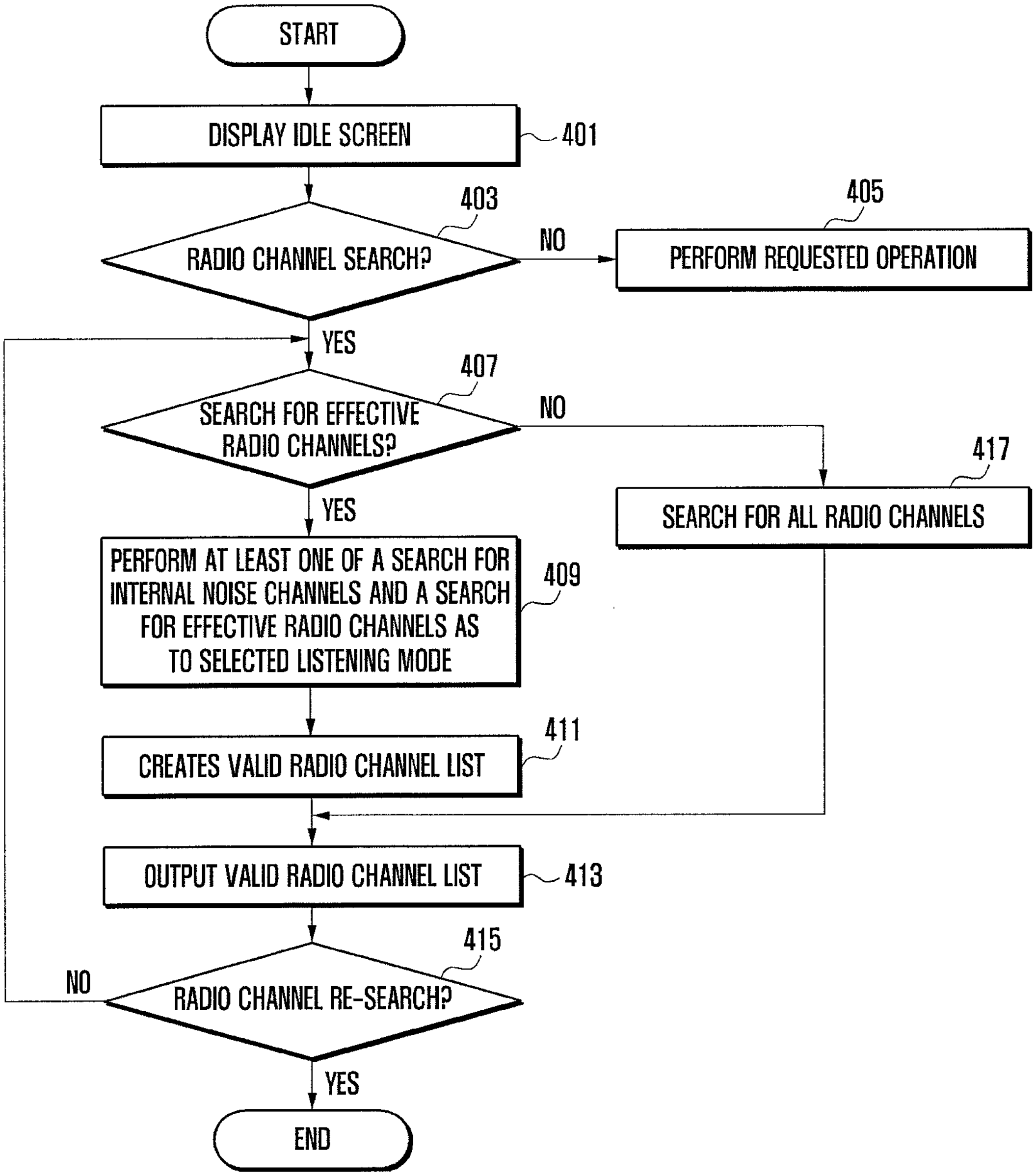
FIG. 4 is a flowchart of a method for providing a radio channel list according to an exemplary embodiment of the present invention.

FIG. 4 is a flowchart of a method for providing a radio channel list according to an exemplary embodiment of the present invention.

Referring to FIG. 4, the mobile terminal 100 is turned on and power is supplied. After supply of power, the mobile terminal 100 initializes components thereof and performs an operation according to preset scheduling information. The control unit 160 of the mobile terminal 100 may display a preset idle screen on the display unit 140 at step 401. According to exemplary embodiments of the present invention, the displaying of an idle screen at step 401 may be skipped, and the method for providing a radio channel list may start from step 403 for radio channel search.

In response to an input signal (e.g., from at least one of the input unit 120 and the display unit 140 having a touchscreen capability), the control unit 160 checks whether the input signal is a request for radio channel search at step 403. If the input signal is not a request for radio channel search, then the control unit 160 may perform an operation indicated by the input signal at step 405. For example, the control unit 160 may control an operation to perform call handling, playback of a file, broadcast reception, file search, web access, or the like.

If the input signal is a request for radio channel search, then the control unit 160 checks whether the request for radio channel search indicates a search for effective radio channels at step 407. For example, a search for effective radio channels may be indicated by settings or by a user input. If the request for radio channel search indicates a search for effective radio channels, then the control unit 160 performs at least one of a search for internal noise channels and a search for effective radio channels as to a selected listening mode according to user input or settings at step 409. To perform a search for internal noise channels, the control unit 160 may operatively turn on and turn off the switch 180 disposed between the radio module 190 and the radio antenna 170. The control unit 160 may also collect corresponding channel search results. To perform a search for effective radio channels according to a selected listening mode, the control unit 160 may identify the current listening mode of the mobile terminal 100 and search effective radio channels in frequency bands assigned to the identified listening mode. Step 409 (e.g., a search for internal noise channels and a search for effective radio channels as to a selected listening mode) is described in more detail with reference to FIGS. 5 and 6. Thereafter, at step 411, the control unit 160 creates a valid radio channel list on the basis of the search results obtained at step 409 and proceeds to step 413.

If the request for radio channel search does not indicate a search for effective radio channels at step 407, then the control unit 160 performs a search for all radio channels at step 417. The control unit 160 outputs a list of found radio channels at step 413. At step 413, the control unit 160 may output the valid radio channel list created at step 411 on the display unit 140, or may output a list of all radio channels found at step 417 on the display unit 140.

The control unit 160 checks whether a request for radio channel re-search is made at step 415. If an input signal for requesting radio channel re-search is entered, then the control unit 160 returns to step 407 and performs subsequent steps. If an input signal for requesting radio channel re-search is not entered, then the control unit 160 ends the procedure of radio channel search.

In the above description of the method for providing a radio channel list, a start step (e.g., a step for displaying an idle screen) and an end step are included. However, these steps are introduced only for smooth description of the method, and exemplary embodiments of the present invention are not limited thereby. That is, main elements of the method for providing a radio channel list may include: performing at least one of a search for internal noise channels, and a search for effective radio channels as to a selected listening mode according to a user input signal or preset scheduling information; creating a list of effective radio channels on the basis of the search results; and outputting the created list of effective radio channels.

Figure 5:
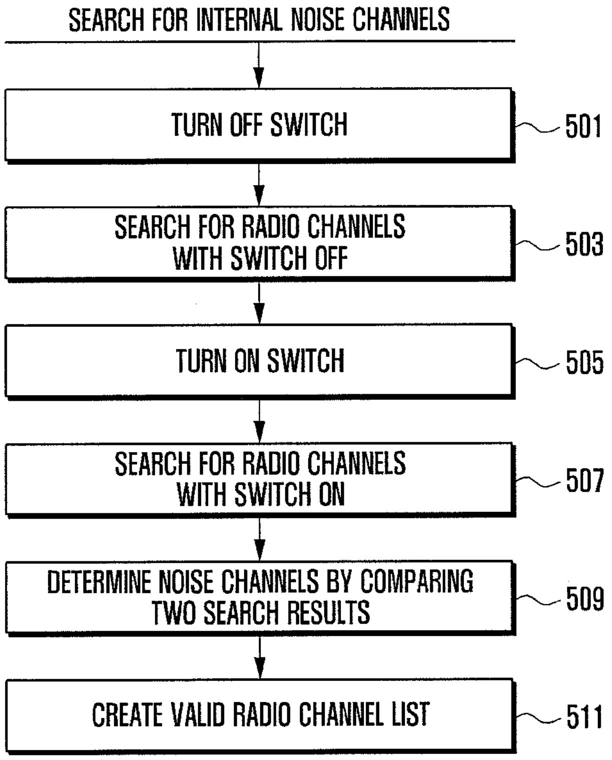
FIG. 5 is a detailed flowchart of a procedure for searching for internal noise channels such as, for example, the procedure for searching for internal noise channels provided in step 409 of FIG. 4, according to an exemplary embodiment of the present invention.

FIG. 5 is a detailed flowchart of a procedure for searching for internal noise channels according to an exemplary embodiment of the present invention.

Referring to FIG. 5, to search for internal noise channels, the control unit 160 of the mobile terminal 100 operatively turns off the switch 180 so as to block the connection between the radio module 190 and the radio antenna 170 at step 501.

The control unit 160 controls the radio module 190 to search for first radio channels while the radio antenna 170 is disconnected from the radio module 190 (e.g., while the switch 180 is turned off) at step 503. The first radio channels are thus radio channels found while the radio antenna 170 is disconnected from the radio module 190.

The control unit 160 turns on the switch 180 so as to recover the connection between the radio module 190 and the radio antenna 170 at step 505. The control unit 160 controls the radio module 190 to search for second radio channels while the radio antenna 170 is connected to the radio module 190 (e.g., while the switch 180 is turned on) at step 507.

The control unit 160 determines noise channels by comparing a list of the first radio channels with a list of the second radio channels at step 509. For example, the control unit 160 may regard entries common to the list of the first radio channels and the list of the second radio channels as a noise channel. The control unit 160 may also regard the first radio channels as a noise channel.

The control unit 160 creates a valid radio channel list without noise channels at step 511. For example, referring to pre-stored information on effective radio channels, the control unit 160 may determine one or more of the first radio channels as a valid radio channel. Then, the control unit 160 may remove the first radio channels from the list of the second radio channels except for radio channels determined as valid or effective.

Figure 6:
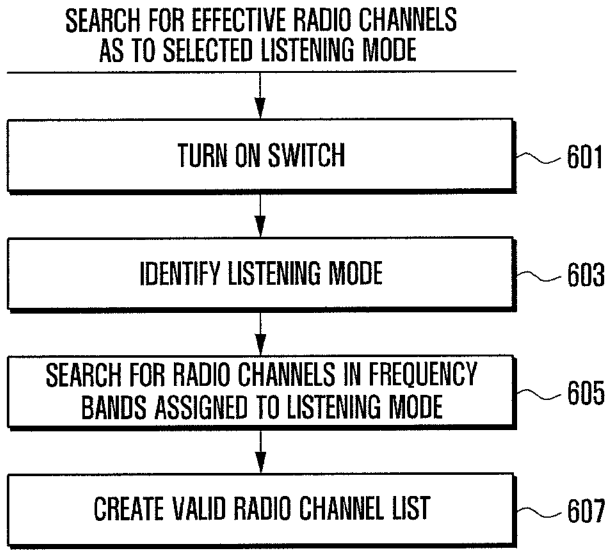
FIG. 6 is a detailed flowchart of a procedure for searching for effective channels according to a selected mode such as, for example, the procedure for searching for effective channels provided in step 409 of FIG. 4, according to an exemplary embodiment of the present invention.

FIG. 6 is a detailed flowchart of a procedure for searching for effective channels according to a selected listening mode according to an exemplary embodiment of the present invention.

Referring to FIG. 6, the control unit 160 operatively turns on the switch 180 so that the radio antenna 170 is connected to the radio module 190 at step 601.

The control unit 160 identifies the current listening mode of the mobile terminal 100 at step 603. Here, the listening mode may be one of a mono mode, a stereo mode, an RDS mode, and an RBDS mode. The listening mode may be set at the time of activation of the radio module 190 and may be changed according to user selection.

The control unit 160 searches for radio channels in frequency bands assigned to the identified listening mode at step 605. For example, when the identified listening mode is an RDS mode and radio frequencies are allocated in units of 100 KHz, the control unit 160 may control the radio module 190 to perform radio channel search in frequency bands of 54-60 KHz, 154-160 KHz, and the like. As described before in connection with FIG. 3, the RDS mode is assigned in a frequency band of 54-60 KHz. If the identified listening mode is a mono mode, then a search for effective radio channels may be performed on the basis of a frequency band assigned to the mono mode and radio channel allocation cycles. The radio channel allocation cycle may differ according to geographic region or country. In the description above, the radio channel allocation cycle is assumed to be 100 KHz. After radio channel search, the control unit 160 creates a valid radio channel list on the basis of information on the searched radio channels at step 607.

As described above, the method and the mobile terminal according to exemplary embodiments of the present invention may provide a list of effective radio channels without invalid channels caused by internal noise. In creation of the list of effective radio channels, the mobile terminal may search those frequency bands allocated only to the currently selected listening mode. Hence, the mobile terminal may rapidly conduct radio channel search and provide information related only to the currently selected listening mode.

Although not shown, if necessary, the mobile terminal 100 may further include at least one of a short-range communication module for short-range communication, a data communication interface based on wired and wireless communication, an Internet communication module for Internet access, and a digital broadcast receiving module for playing back digital broadcasts. With the digital convergence trend, it should be apparent to those skilled in the art that the mobile terminal 100 according to exemplary embodiments of the present invention may further include a unit comparable to the above-described units, and that one unit of the mobile terminal 100 may be removed or replaced with another unit.

The mobile terminal 100 according to exemplary embodiments of the present invention may be a device capable of outputting screen images to the display unit, and may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smartphone, a laptop computer, a handheld computer, or the like.

In a feature of exemplary embodiments of the present invention, the method for providing a radio channel list and a mobile terminal supporting the same may provide a radio channel list that includes only effective radio channels available to the user.

Because the radio channel list includes only effective radio channels, the user is not inconvenienced by the possibility of selecting an ineffective radio channel. Accordingly, a user may easily and rapidly select a desired radio channel.

According to exemplary embodiments of the present invention, the word “unit”, “module” or the like may refer to a software component or hardware component such as an FPGA or ASIC capable of carrying out a function or an operation. However, “unit” or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

While the invention has been shown and described with reference to certain exemplary embodiments thereof, it will be understood those skilled in the art that various changes in form and details may be made therein without departing from the spirit and scope of the present invention as defined by the appended claims and their equivalents.

What is claimed is:

1. A mobile terminal for providing a radio channel list, the terminal comprising:
- a radio module for performing a radio channel search and for supporting radio broadcast reception;
- a radio antenna that serves as an antenna for the radio module;
- a switch placed between the radio module and the radio module; and
- a control unit for controlling a process of generating a first channel list of ineffective radio channels by performing radio channel search while the radio antenna is operatively disconnected from the radio module by the switch, generating a second channel list of effective radio channels by performing radio channel search while the radio antenna is operatively connected to the radio module by the switch, creating a valid radio channel list by removing entries of the first channel list from the second channel list, and providing the created valid radio channel list.

2. The mobile terminal of claim 1, further comprising a storage unit for storing information associated with actual effective radio channels.

3. The mobile terminal of claim 2, wherein the control unit controls an operation so that a channel included in the first channel list that is indicated by the actual effective radio channel information stored in the storage unit is included in the valid radio channel list.

4. The mobile terminal of claim 1, wherein the control unit identifies a current listening mode, and controls an operation to search only for radio channels related to the current listening mode based on a frequency band associated with the current listening mode and a preset radio channel allocation cycle.

5. The mobile terminal of claim 4, wherein the control unit controls an operation to create a valid radio channel list that includes only radio channels that are related to the current listening mode and that are not included in the first channel list.

6. The mobile terminal of claim 1, further comprising a display unit for displaying the valid radio channel list.

7. A mobile terminal for providing a radio channel list, the terminal comprising:

a radio module for performing a radio channel search and for supporting radio broadcast reception;

a radio antenna that serves as an antenna for the radio module;

a switch placed between the radio module and the radio module; and a control unit for controlling a process of identifying a current listening mode while the radio antenna is operatively connected to the radio module, creating a radio channel list by searching for only radio channels related to the current listening mode based on a frequency band assigned to the current listening mode and a preset radio channel allocation cycle, and providing the created radio channel list.

8. The mobile terminal of claim 7, wherein the control unit controls an operation to generate a first channel list of ineffective radio channels by performing radio channel search while the radio antenna is operatively disconnected from the radio module by the switch.

9. The mobile terminal of claim 8, wherein the control unit controls an operation to create a valid radio channel list by removing channels that are included in the first channel list from the radio channel list.

10. The mobile terminal of claim 9, further comprising a storage unit for storing information associated with actual effective radio channels.

11. The mobile terminal of claim 10, wherein the control unit controls an operation so that a channel included in the first channel list that is indicated by the actual effective radio channel information stored in the storage unit is included in the valid radio channel list.

12. A method of providing a radio channel list, the method comprising:

generating a first channel list of ineffective radio channels by performing radio channel search while a radio antenna is operatively disconnected from a radio module by a switch;

generating a second channel list of effective radio channels by performing radio channel search while the radio antenna is operatively connected to the radio module by the switch;

creating a valid radio channel list by removing entries of the first channel list from the second channel list; and outputting the valid radio channel list.

13. The method of claim 12, further comprising:

examining information associated with actual effective radio channels stored in a storage unit; and adding an entry of the first channel list that is indicated by the stored actual effective radio channel information to the valid radio channel list.

14. The method of claim 12, further comprising:

identifying a current listening mode of the radio module; and searching for only radio channels related to the current listening mode based on a frequency band assigned to the current listening mode and a preset radio channel allocation cycle.

15. The method of claim 14, wherein creating a valid radio channel list comprises creating a valid radio channel list that includes only radio channels that are related to the current listening mode and that are not included in the first channel list.

16. A method of providing a radio channel list, the method comprising:

toggling a switch that is disposed between a radio module and a radio antenna between a connected state and a disconnected state;

identifying a current listening mode of the radio module;

searching for radio channels related only to the current listening mode while the radio antenna is operatively connected to the radio module by the switch based on a frequency band assigned to the current listening mode and a preset radio channel allocation cycle;

creating a valid radio channel list that includes only radio channels searched in relation to the current listening mode; and outputting the valid radio channel list.

17. The method of claim 16, further comprising generating a first channel list of ineffective radio channels by performing radio channel search while the radio antenna is operatively disconnected from the radio module by the switch.

18. The method of claim 17, wherein creating a valid radio channel list comprises creating a valid radio channel list that includes only radio channels searched in relation to the current listening mode and that are not included in the first channel list.

19. The method of claim 17, further comprising:

examining information associated with actual effective radio channels stored in a storage unit; and adding an entry of the first channel list that is indicated by the stored actual effective radio channel information to the valid radio channel list.

20. A method of providing a radio channel list, the method comprising:

disconnecting a radio antenna from a radio module;

searching for radio channels having interference when the radio antenna is disconnected from the radio module;

generating a first channel list based on radio channels found to have interference when the radio antenna is disconnected from the radio module;

connecting the radio antenna to the radio module;

searching for radio channels through which at least one of a signal and noise is being transmitted;

generating a second channel list based on radio channels found to have at least one of a signal and noise being transmitted therethrough;

determining which of the channels provided in the second channel list respectively correspond to a valid radio channel based on a comparison between the first channel list and the second channel list;

generating a valid radio channel list comprising any of the channels determined to correspond to a valid radio channel; and outputting the valid radio channel list.

* * * * *